United States Patent [19]
Iorio et al.

[11] Patent Number: 5,590,691
[45] Date of Patent: Jan. 7, 1997

[54] EXTRUDED MULTIPLE PLASTIC LAYER COATING BONDED TO A METAL TUBE

[75] Inventors: Ralph A. Iorio, Bloomfield Hills; Robert M. Davie, Lapeer; James D. McDaniel, Ortonville; Frank L. Mitchell, Rochester; Tao Nie, Macomb, all of Mich.

[73] Assignee: ITT Corporation, New York, N.Y.

[21] Appl. No.: 237,610

[22] Filed: May 2, 1994

[51] Int. Cl.$^6$ .......................................... F16L 9/14
[52] U.S. Cl. .......................... 138/146; 138/137; 138/140; 138/143
[58] Field of Search ..................... 138/131, 138, 138/137, 140, 141, 143, DIG. 1, 146

[56] References Cited

U.S. PATENT DOCUMENTS

| | | |
|---|---|---|
| 3,070,132 | 12/1962 | Sheridan . |
| 3,473,087 | 10/1969 | Slade . |
| 3,561,493 | 2/1971 | Maillard et al. . |
| 3,828,112 | 8/1974 | Johansen et al. . |
| 3,907,955 | 9/1975 | Viennot . |
| 4,059,847 | 11/1977 | Phillips et al. . |
| 4,272,585 | 6/1981 | Strassel . |
| 4,273,798 | 6/1981 | Scheiber . |
| 4,303,457 | 12/1981 | Johansen et al. . |
| 4,330,017 | 5/1982 | Satoh et al. . |
| 4,448,748 | 5/1984 | Radtke et al. . |
| 4,675,780 | 6/1987 | Barnes et al. . |
| 4,685,090 | 8/1987 | Krevor . |

(List continued on next page.)

FOREIGN PATENT DOCUMENTS

| | | |
|---|---|---|
| 0551094 | 7/1993 | European Pat. Off. . |
| 2577168 | 8/1986 | France . |
| 2577564 | 8/1986 | France . |
| 3821723 | 9/1989 | Germany . |
| 4001125 | 12/1990 | Germany . |
| 4001126 | 12/1990 | Germany . |
| 9007303 | 12/1990 | Germany . |
| 3942354 | 6/1991 | Germany . |
| 4006870 | 7/1991 | Germany . |
| 9400522 | 1/1994 | Germany . |

OTHER PUBLICATIONS

Material Safety Data Sheet, Central Glass Co., Ltd., pp. 1–2 Mar, 1991.
State of California Air Resources Board, pp. 1–2, A2–A4, B2–B43 Sep., 1991.
Rosato, Donald V. et al., Designing with Plastic and Composites: A Handbook, pp. B–18–B–33, Copyright 1991.
Santoprene Thermoplastic Rubber, Fluid Resistance, Advanced Elastomer Systems, pp. 1–12, copyright 1992.
Ulchem Corporation, Material Safety Data Sheet, May 23, 1990.

(List continued on next page.)

*Primary Examiner*—James E. Bryant, III
*Attorney, Agent, or Firm*—Thomas N. Twomey; J. Gordon Lewis

[57] ABSTRACT

A multi-layer tube comprises a metal tube having an outer surface and a zinc layer bonded to the metal tube outer surface, wherein the zinc layer is selected from the group consisting of zinc plating, zinc nickel alloys, zinc cobalt alloys, zinc aluminum alloys, and mixtures thereof. A surface treatment layer is bonded to the zinc layer, wherein the surface treatment layer is selected from the group consisting of a zinc/aluminum/rare earth alloy, phosphate, chromate and mixtures thereof. A first polymeric layer is bonded to the surface treatment layer, wherein the first polymeric layer is selected from the group consisting of a thermoplastic elastomer, an ionomer, a nylon, a fluoropolymer, and mixtures thereof. A second polymeric layer is bonded to the first polymeric layer, wherein the second polymeric layer is selected from the group consisting of a nylon, a thermoplastic elastomer, a fluoropolymer, and mixtures thereof. A process for manufacturing a multi-layer tubing for conveying fluids in a vehicle system comprises the step of extruding multiple layers of a melt-processible thermoplastic to a pretreated metal tube having an external surface with at least a zinc based coating and a sealant coating on top of the zinc based coating.

20 Claims, 4 Drawing Sheets

U.S. PATENT DOCUMENTS

| | | |
|---|---|---|
| 4,853,297 | 8/1989 | Takahashi et al. . |
| 4,880,036 | 11/1989 | Kitami et al. . |
| 4,887,647 | 12/1989 | Igarashi et al. . |
| 4,984,604 | 1/1991 | Nishimura . |
| 4,990,383 | 2/1991 | Bergström et al. . |
| 5,019,309 | 5/1991 | Brunnhofer . |
| 5,038,833 | 8/1991 | Brunnhofer . |
| 5,076,329 | 12/1991 | Brunnhofer . |
| 5,112,692 | 5/1992 | Strassel et al. . |
| 5,142,782 | 9/1992 | Martucci . |
| 5,143,122 | 9/1992 | Adkins . |
| 5,167,259 | 12/1992 | Brunnhofer . |
| 5,170,011 | 12/1992 | Martucci . |
| 5,219,003 | 6/1993 | Kerschbaumer . |
| 5,277,228 | 1/1994 | Yamanashi ............................ 138/143 |
| 5,284,184 | 2/1994 | Noone et al. . |

OTHER PUBLICATIONS

Kraton, Processing and Fabricating Kraton Thermoplastic Rubber Compounds, Shell Chemical Company pp. 1–26, Apr., 1988.

Material Safety Data Sheet, Shell, pp. 1, 3, 5, 1, Aug. 10, 1990.

Kraton, Typical Properties 1990, Shell Chemical Company, pp. 1–11.

Sarlink 1000 Series, Material Safety Data Sheet, DSM Thermoplastic Elastomers, Inc., Jan. 14, 1992, pp. 1–4, Jan. 14, 1992.

Sarlink Thermoplastic Elastomers, The Alternative TPEs, Nov., 1989.

Nonmetallic Air Brake System Tubing—SAE J844 Jun. 1990, SAE Standard.

Kirk–Othmer, Encyclopedia of Chemical Technology, 3rd Edition, vol. 18 (New York, John Wiley & Sons) pp. 406–425, copyright 1982.

Standard Specification for Zinc—5% Aluminum–MischMetal Alloy (UNS 238510) in Ingot Form for Hot Dip Coatings Sep., 1988, pp. 669–670.

Conductive Polymers and Plastics (Chapman and Hall, New York), James M. Margolis, pp. 119–124, copyright 1989.

Plastics Digest Thermoplastics and Thermosets, International Plastics Selector, Edition 14, vol. 2, 1993.

Principal Properties, 1992, D.A.T.A. Business Publishing, pp. 2–116–2–119.

A Designer's Guide to Six Versatile, Use–Proven Plastic Resins from DuPont, Sep., 1984.

Product Guide, Tough and Durable for Long–Lasting, Good–Looking, Lightweight Products, DuPont, Feb., 1985.

Principal Properties, 1992, D.A.T.A. Business Publishing, pp. 2–1283–2–1284.

John W. Nicholson, The Chemistry of Polymers, pp. 147–149, copyright 1991.

Material Safety Data Sheet, E. I. DuPont, Nov. 1985.

EXTRUDED MULTIPLE PLASTIC LAYER COATING BONDED TO A METAL TUBE

FIELD OF THE INVENTION

This invention relates to a multi-layer coated metal tube, and more particularly to a metal tube having an outer surface coated with a plurality of layers of plastic material securely bonded thereto.

BACKGROUND OF THE INVENTION

Metal pipes often have their outer surfaces covered with a protective coating. These pipes are used for conveying brake fluids, fuel and the like in a motor vehicle. As such, these pipe lines are located under the body of the vehicle. Since they are used in such a harsh environment, the pipes are required to have a high degree of corrosion resistance, scratch resistance, impact strength and mechanical wear resistance. In cold climates, it is not unusual to encounter rock salt sprinkled onto road surfaces in order to prevent freezing of water on the road surfaces and the inherent dangers caused thereby. The popularity of spreading rock salt has created a serious problem of pipe corrosion. The pipes are also vulnerable to damage or wear from stones or mud spattered by rotating wheels of the vehicle. It is, therefore, necessary that the pipes attached to the underbody of the vehicle be coated so as to resist both chemical corrosion and mechanical damage or wear.

A double-rolled steel pipe has been proposed that is made by rolling a steel strip or hoop twice and brazing its longitudinal edges by means of a copper plating layer, or a seam welded steel pipe, where the pipe has an outer surface coated with an electroplated zinc film. The zinc film has an outer surface coated with a relatively thick special chromate film having an olive color. The chromate film has an outer surface coated with a fluorinated resin film. The fluorinated resin film is formed by impregnating the chromate film with a dispersion of polyvinyl fluoride immediately after the formation of the chromate film when it is still in the state of a gel, and drying them under heat, so that the fluorinated resin film may form an intimate bond with the chromate film. When the chromate film is formed by treating the pipe with a solution, it requires large amounts of a chromium compound and an organic acid, such as formic acid, used as a reducing agent. It is necessary to supply the treating solution with the chromium compound frequently, and to renew it at regular intervals of time in order to maintain a constant film forming capacity. The waste solution, however, contains a large amount of chromium having a valence of 6, which is a toxic substance, and its disposal, therefore is very costly. Although the chromate film as formed is highly resistant to corrosion, the heat to which it is exposed during the formation of the resin film deprives it of water and thereby makes it brittle. Any plastic deformation of the pipe, such as the result of bending or double flaring, forms fine cracks in the chromate film which lowers its rustproofing properties.

It has also been proposed to provide a corrosion resistant pipe where a metal pipe is provided with an outer surface coated with a zinc film, a chromate film, an intermediate layer consisting sequentially of an epoxy resin, and a polyvinyl fluoride film formed one on top of another in the order listed. A plastic-coated steel tube has also been proposed where a steel tube has an inner layer of at least one cross-linked polyolefin modified with a hydrolyzable silane and an outer unmodified or soot-blended polyolefin layer on the exposed surface of the inner layer. A process for coating metal tubes with plastic material has also been disclosed where a fixed metal tube is heated to a temperature above the melting point of the plastic material to be employed, thereafter causing a mixture of plastic powder and air to pass through the metal tube whereby the plastic material is fritted onto the inside surface of the tube, thereafter rotating the metal tube and applying to the exterior surface thereof in a plurality of stages a plastic material, the plastic material being electrostatically sprayed onto the rotating metal tube and after each stage of electrostatically applying plastic to the outside surface of the metal tube and applying plastic material to the inside surface thereof, completely melting and smoothing the plastic material.

An automobile tube line for a brake, fuel or hydraulic system has also been disclosed with an interior steel tube having a galvanized exterior layer with an additional exterior olive chromated layer which is wrapped in an additional Nylon 12 layer casing where the plastic casing is a polyamide layer applied by extrusion on top of the olive chromated layer.

SUMMARY OF THE INVENTION

It is desirable in the present invention to provide brake lines and fuel lines, and other lines which could be damaged by the regular use of an automobile, which can meet the continuous demand of traffic conditions, and therefore must have a long lasting durability of ten years or more. In such application areas, resistance to corrosion, resistance against breaking, cracking or bursting due to internal pressure, resistance to stone impact and a high corrosion resistance against winter salt are all desirable characteristics. At this time, tube lines made of steel are currently being used in a large capacity. For brake lines, double-wrap steel tubes are suitable, whereas single wall straight bead welded steel pipes are more appropriate for fuel lines.

The extruded multiple plastic layer coating bonded to a metal tube and the process therefor according to the present invention provides numerous advantages over the prior known tubing configurations. In particular, the multiple layer allows greater selection of materials for meeting varying application and environmental conditions. The multiple layers allows the application of a coating on top of the basic corrosion resistant coating to act as a cushion thereby eliminating the necessity of assembling a protective sleeve or heatshrink tube to outside of the tube for stone impingement protection. The multi-layer coating according to the present invention also allows use of recycled materials in the inner layer, sometimes referred to as "regrind" materials in intermediate layers at a substantial cost savings without detrimental loss of external coating properties or internal adhesion of the coatings to the external surface of the metal tube. The multi-layer configuration of the present invention also allows the use of less costly materials in the inner layers which may not have the chemical resistance required of the outer layer. The multi-layer configuration allows for alloying of the layers to improve the adhesion to the base metal tube. A multi-layer configuration, even if of the same material, greatly reduces the probability of apertures or perforations in any one layer reaching through to the base tube. The multi-layer configuration provides more precise control of the coating thickness and concentricity about the base tube. Finally, the multi-layer configuration according to the present invention allows for color selection with protection of the color layer below a clear top layer for protection from ultraviolet light, chemical and heat degradation.

In one form, the tube of the present invention includes a metal tube having an outer surface pretreated to form a surface selected from the group consisting of a zinc plate with chromate, a zinc plate with phosphate and chromate, a galvanized zinc layer with phosphate and chromate, a galvanized zinc layer with chromate, a zinc-metal blend with phosphate and chromate, and a zinc-metal blend with chromate, where the zinc-metal blend is selected from a group consisting of zinc-nickel alloy, zinc-cobalt alloy, and zinc-aluminum alloy, and mixtures thereof; an intermediate alloy or bonding layer applied to the pretreated outer surface of the metal tube selected from a group consisting of Nylon 12, Nylon 6, zinc chloride resistant Nylon 6, thermoplastic elastomers, fluoropolymers, and mixtures thereof, in combination with at least one of the group consisting of a thermoplastic elastomer, an ionic polymer, a polyamide, and mixtures thereof; and an external layer selected from a group consisting of a Nylon 12, zinc chloride resistant Nylon 6, thermoplastic elastomers, fluoropolymers, and mixtures thereof.

The process of the present invention in one form includes the steps of pretreating the metal tube to remove oxides and to improve the metal surface for subsequent treating, applying a metal layer to the pretreated metal surface where the metal layer has as a major constituent zinc, applying at least one sealing surface treatment selected from the group consisting of a phosphate surface treatment, zinc-aluminum alloy surface treatment material and chromate surface treatment material on top of the metal layer, and extruding multiple layers of plastic onto the treated surface of the metal tube for bonding thereto.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED AND ALTERNATIVE EMBODIMENTS

Corrosion can be minimized by various methods, for example, by the use of a coating of protective metal such as zinc, tin, lead, nickel or copper; by the production of oxide, phosphate or similar coatings on iron and steel surfaces; by the application of protective paints; and by rendering the surface of the metal passive. Galvanizing zinc is applied to metal surfaces by dipping into a bath of molten zinc, by electrodeposition, or by metal spraying.

In the hot process, after being thoroughly cleaned, the articles are dipped into a bath of molten zinc. The bath must be maintained at a temperature somewhat higher than the melting point of zinc. The portion of the zinc surface through which the material to be coated enters the zinc bath is kept covered with a flux; ammonium chloride and zinc chloride are widely used for this. The process is used almost exclusively for sheet, pipe and wire. One or two percent tin is often added in the coating of sheets in order to obtain a very uniform coating and to improve the surface appearance. A coating applied by hot dipping never consists of a simple layer of zinc. It is always of a composite nature, the layer adjacent to the base metal consisting of zinc-iron alloys. This layer is relatively brittle and, thereby, imposes some limitations on hot-dipped galvanized materials for certain uses. A coating of 1 oz/ft$^2$ (305 g/m$^2$) of exposed surface is considered very suitable for most conditions of service.

The electrolytic or cold process consists in setting up the articles to be coated as cathodes and an electrolytic bath of soluble zinc salts, the anode being metallic zinc. The article to be coated being connected to the cathode of the system. Both the acid sulfate and the cyanide bath are used. The high ductility of the pure zinc coating obtained is the outstanding feature of such a coating. The ease of control of the uniformity and thickness is also advantageous.

A phosphate coating, in itself, forms only a very slight degree of protection against corrosion. Coatings of this kind are not suitable for severe outdoor service. Phosphating a steel surface is an excellent method of priming prior to subsequent painting or lacquering. The phosphate can be electrolytically applied, or can be applied by spraying. The phosphate treatment is also applicable to zinc surfaces.

The multi-layer tubing 10 according to the present invention includes a metal tube or pipe 12. The metal tube 12 may be welded steel tube, brazed steel tube, aluminum, copper or stainless steel. The process of the present invention is capable of applying a multi-layer coating over any rigid or semi-rigid tubular material. Of particular interest in the present invention, is the mechanical durability and corrosion resistance advantage obtained with carbon steel in either a welded single wall or brazed double wall form of tube or piping. Application of multi-layer coatings on other materials may be of a decorative nature with some protection also being obtained, for example improved chemical resistance of the outer shell of the multi-layer coating over the underlying rigid or semi-rigid tubular material.

Figure 1:
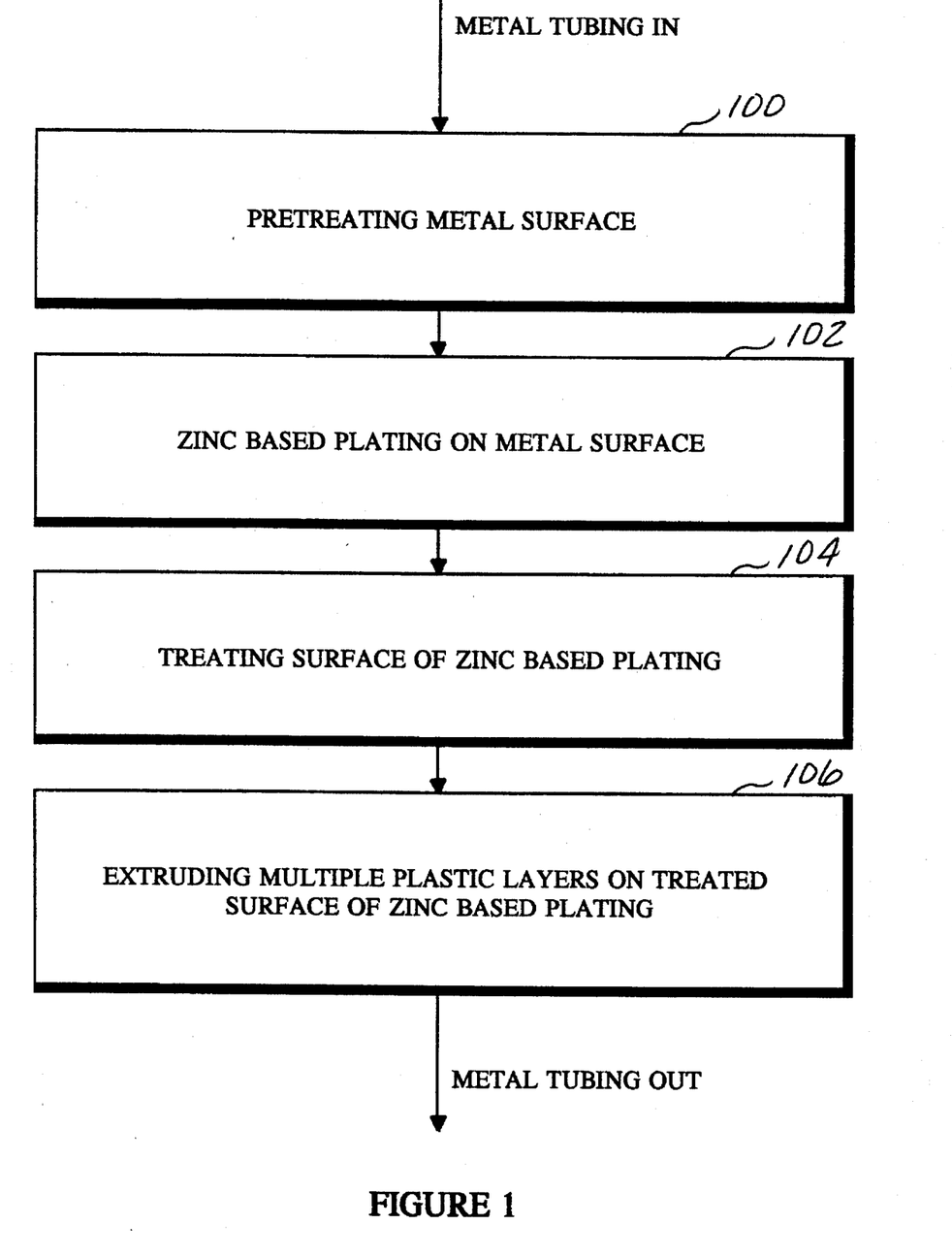
FIG. 1 is a simplified flow diagram of a process according to the present invention for extruding multiple plastic layer coatings bonded to a metal tube.

Referring now to FIG. 1, the metal tubing 12 is pretreated as required through various clean and rinse stages 100. In addition, the pretreating of the metal surface may also include pickling to remove oxides and to improve the metal surface for deposition of a metal based coating, such as a zinc based coating that is applied by hot dip galvanization, sometimes referred to as the "hot process" as previously described, or the preferred method of electrolytic bath coating or plating sometimes referred to as the "electrolytic or cold process" as previously described. In the alternative, previously pretreated metal tubing 12 may be supplied to the zinc based coating process step 102 according to the present invention, or a previously zinc base coated metal tubing 12 may be supplied to the surface treating step 104 of the process according to the present invention. In either case, metal tubing 12 with a zinc based coating applied thereon in a range of 0.4 to 1.0 mil is either produced or supplied for subsequent treating as will be disclosed hereinafter according to the present invention.

The external surface of the zinc based coating is treated to seal the zinc based coating to prolong its corrosion resistance and to provide a suitable surface for application of and bonding to extruded multiple layers of plastic to be subsequently supplied. The surface treatment of the zinc based coating is at least one of the surface sealing treatments selected from the group of a phosphate coating, a chromate coating including the clear, yellow and green versions, a zinc-aluminum alloy coating, and combinations thereof. A suitable zinc-aluminum alloy and coating is described in U.S. Pat. No. 4,448,748 which is incorporated herein by reference, and ASTM Designation: B750-88 provides a standard specification for zinc-5% aluminum-mischmetal alloy in ingot form hot-dip coatings, which is also incorporated herein by reference. Metal tubing pretreatment prior to plastic application can include combinations such as zinc-aluminum alloy with a phosphate coating and a chromate coating, zinc plate with a chromate coating, zinc plate with a phosphate coating and a chromate coating, galvanized zinc with a phosphate coating and/or a chromate coating, zinc-nickel alloy plate with a phosphate coating and/or a chromate coating, zinc-cobalt alloy with a phosphate coating and/or a chromate coating, a chromate coating of the clear, yellow and green versions, and combinations thereof. The pretreatment of the metal surface prior to the zinc base coating can include sand, shot or bead blasting, or other means of abrading the surface to roughen it, or detergent cleaning with rinse and acid pickling followed by a rinse. Any suitable surface abrading or etching process, either chemical or mechanical, may be used as a pretreatment prior to any other surface treatment and/or prior to extruding plastic onto the metal surface. The chromate coating can be applied as a wash having essentially no remaining weight. The zinc-aluminum alloy coating can be applied with a weight selected in a range of between 36 to 95 g/m$^2$ inclusive, and with a preferred weight range of between 75 to 80 g/m$^2$ inclusive and a most preferred weight of 78 g/m$^2$. The phosphate coating can be applied with a weight in the range of between 120 to 250 mg/ft$^2$ (1.292 to 2.691 g/m$^2$) inclusive. The zinc based coating on the metal surface is preferably a weight in the range of between 13 to 35 microns inclusive.

Various combinations of multi-layer tubing 10 according to the present invention have been prepared with metal tube 12 having a 3/16 inch diameter brazed tube, or 5/16 inch and 3/8 inch diameter welded steel tube. The process according to the present invention is not size dependent, and therefore it is anticipated that other sizes, including smaller sizes and larger sizes, of metal tube 10 can be processed according to the present invention.

The zinc-aluminum galvanizing alloy or coating preferably contains from about 85% to 97% zinc, from about 4% to 15% aluminum and at least about 5 ppm mischmetal (a variety of known rare earth containing alloys).

After treating the surface of the zinc based coating or layer 14 with the surface treatment layer 16, multiple plastic layers are extruded on the treated surface 16 of the zinc based layer 14 in step 106. In the alternative, multiple plastic layers can be extruded on to the external surface of the metal tube 12 without pretreatment. In either case, the multiple plastic layers preferably include at least an alloy or bonding layer, referred to herein as a first layer 18 formed on top of the treated surface layer 16 and an external shell or second layer 22 exposed to the outside environment. An optional intermediate or third layer 20 may be provided between the first layer 18 and the second layer 22 and may include one or more sublayers of plastic materials. Prior to extruding the multiple plastic layers onto the treated surface 16, the metal tube 12 is preheated to temperatures in the range of between 177° C. to 232° C. (350° F. to 450° F.) inclusive, with a preferred range of between 204° C. to 232° C. (400° F. to 450° F.) inclusive. The multiple layers of extruded plastic form a coating over the treated surface 16 with an overall thickness in a range of between 75 to 300 microns (3 to 12 mils), with a preferred range of between 125 to 250 microns (5 to 10 mils). Individual plastic layers can be applied with a thickness in a range of between 10 to 250 microns (0.3 to 10 mils) inclusive, with a preferred range of between 125 to 250 microns (5 to 10 mils) inclusive.

Figure 2:
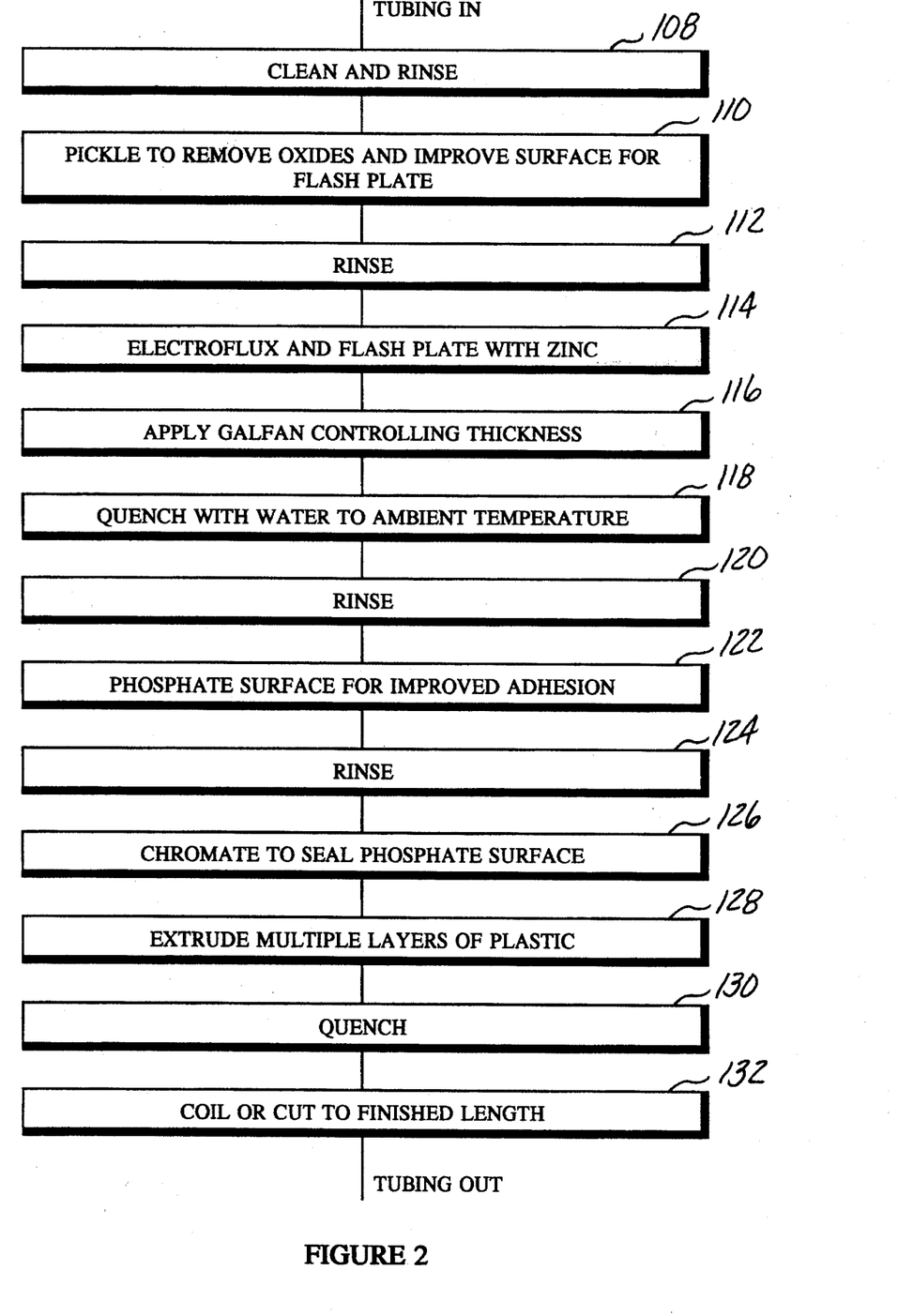
FIG. 2 is a second flow diagram of the process according to the present invention.

Referring now to FIG. 2, a more detailed flow diagram of a process according to the present invention is depicted. The tubing 12 as previously described is subjected to a clean and rinse step 108 followed by a pickling process step 110 to remove oxides and to improve the external metal surface for subsequent flash plating. After the pickling step 110, the metal tubing 12 is subjected to a rinse step 112. The electroflux and flash plate with zinc step 114 then applies the zinc based layer of a thickness in the range of 0.4 to 1.0 mil inclusive. A zinc-aluminum alloy coating is then applied to the external surface of the zinc based layer. A suitable zinc-alloy coating is commercially available under the tradename GALFAN from Eastern Alloys, Inc. of Maybrook, N.Y. The sealing step 116, of applying GALFAN while controlling the thickness in a range of 36 to 95 g/m$^2$ with a most preferred thickness of 78 g/m$^2$, is followed by a water quench step 118 to bring the tubing 12 back to ambient temperature, followed by a rinse step 120. It is to be understood that any of the quenching steps as discussed herein may be performed using any suitable material or process. Step 122 provides for a phosphate surface to be applied to the external surface of the GALFAN coating for improved adhesion of subsequent layers. A rinse step 124 follows the phosphating step 122. The application of a chromate coating occurs in step 126 to seal the phosphate surface applied in step 122. The phosphate surface is preferably applied with a thickness in the range of 120 to 250 mg/ft$^2$ (1.292 to 2.691 g/m$^2$), while the chromate coating may be applied as a wash having essentially no remaining weight on the tubing upon completion. After the chromate wash step 126, the multiple layers of plastic are extruded onto the metal tubing 12 in step 128. Preferably, the tubing has been heated in a range of between 375° to 450° F. inclusive with a preferred temperature of 425° F. prior to the application of the multiple layers of plastic in step 128. A conventional mechanical applicator or extrusion head is used for coextruding the multiple layers of plastic simultaneously onto the surface of the preheated metal tube 12. In the preferred configuration, vacuum is applied to the head of the applicator to pull the plastic material down onto the surface of the preheated tube 12. The vacuum applied is preferably in the range of 1 inch to 22 inches of water (where 28 inches of water is equal to atmospheric pressure), with a preferred vacuum pressure of 10 inches of water. After extrusion of the multiple layers of plastic in step 128, the tubing 12 is subjected to a quench in step 130, which can be a water quench, oil quench or other material quench as required, and is thereafter coiled or cut to finished length in step 132.

In lieu of coextrusion, the process could also be carried out as a cross-head application wherein the layers are applied synchronously instead of simultaneously. However, this process is not as preferred as the coextrusion, in that there is a greater likelihood of loss of bonding efficiency and bonding properties, and there tends to be less control over layer thicknesses.

Figure 3:
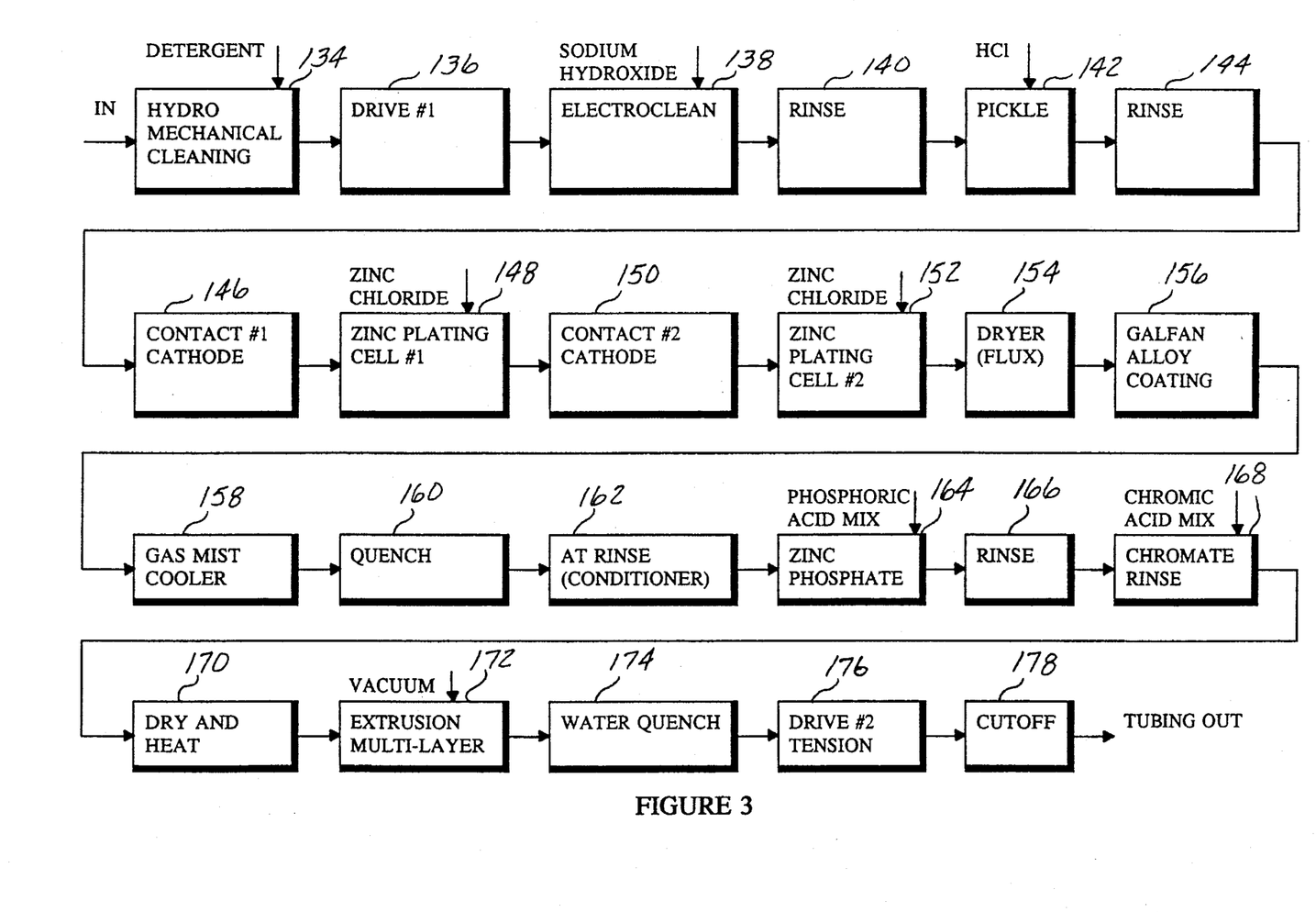
FIG. 3 is a detailed flow diagram of a process according to the present invention.

Referring now to FIG. 3, a detailed flow diagram of a process according to the present invention is disclosed. In step 134, the tubing is subjected to a hydro-mechanical cleaning with detergent additive. In step 136, the tubing is driven by a first drive unit in a continuous process through the following steps described below. The metal tubing 12 is driven through step 138 which includes an electro-cleaning process using sodium hydroxide. After the electro-cleaning process in step 138, the metal tubing 12 passes through a rinse step 140. A pickling step 142 using hydrochloric acid is followed by another rinse step 144. The tubing engages contact #1 cathode at step 146 and passes through a zinc chloride bath at zinc plating cell #1 in step 148. Thereafter, the metal tubing 12 engages contact #2 cathode at step 150 and passes through a zinc chloride bath and zinc plating cell #2 at step 152. At step 154, the metal tubing 12 is subjected to drying, where flux may be applied if appropriate. A zinc-alloy coating is applied in step 156. As previously described, a suitable zinc-alloy coating is available under the tradename GALFAN from Eastern Alloys, Inc. located in Maybrook, N.Y.

The metal tubing 12 then passes through a gas mist cooler at step 158, followed by a quench at step 160 and rinse with conditioner at step 162. The metal tubing then passes through a phosphoric acid mix where a zinc phosphate coating is applied at step 164 followed by a rinse at step 166. Thereafter, the metal tubing 12 passes through a chromic acid mix where a chromate rinse at step 168 seals the phosphate layer followed by drying and heating at step 170. After heating to the desired temperature range, the metal tubing 12 passes through an extrusion head for application of multiple plastic layers to the outer chromate sealing surface in step 172. Preferably, the vacuum is applied to the extrusion head in order to draw the plastic down into intimate contact with the chromate surface. Suitable plastic materials for the multiple layers applied to the metal tubing 12 are described in greater detail herein below. Following the extrusion process step 172, the multi-layer tubing 10 is subjected to a water quench at 174 followed by passing through drive #2 which places the tubing in tension at step 176 followed finally by a cutoff step 178 where the tubing is cut to the appropriate length or coiled as desired.

Figure 4:
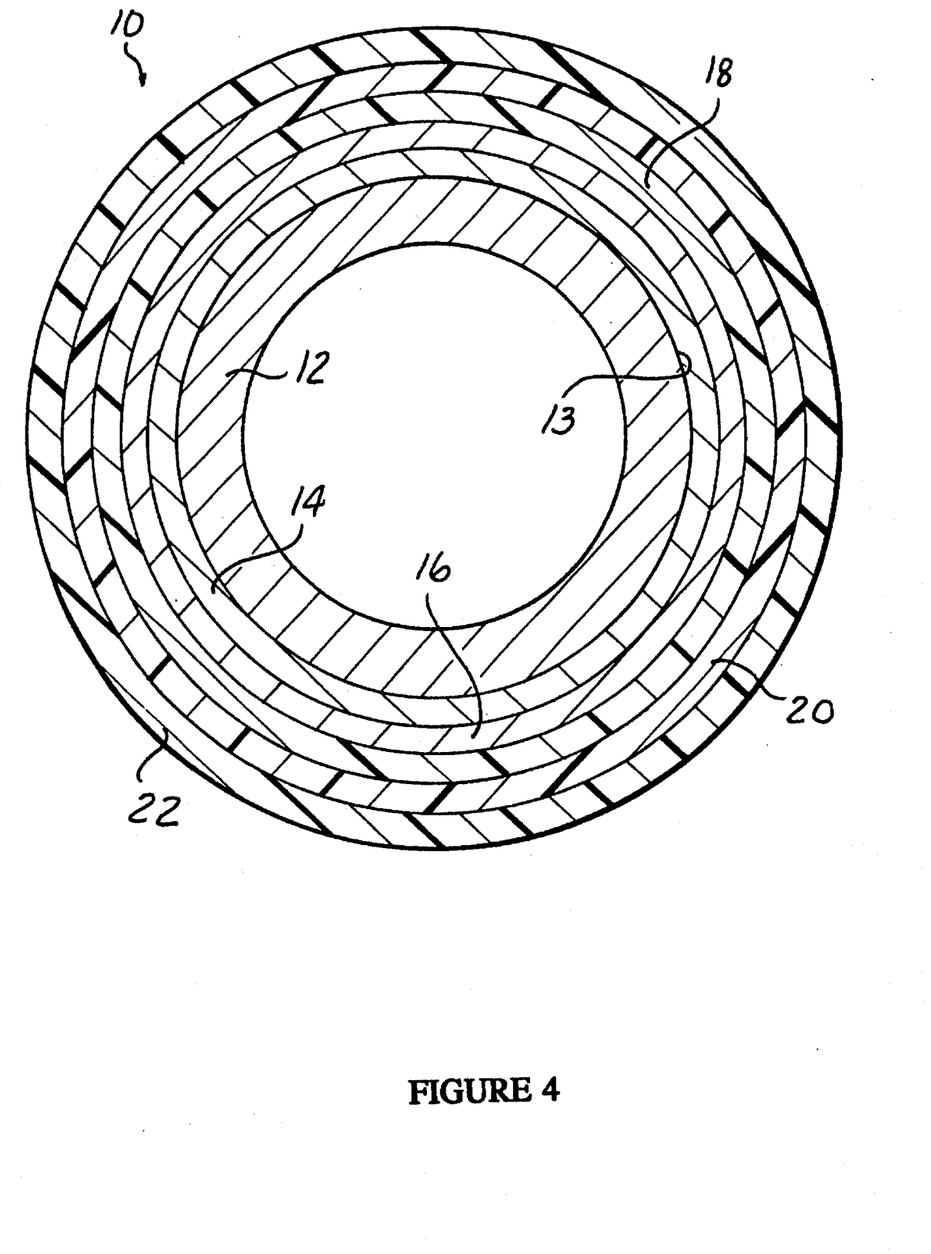
FIG. 4 is a cross-sectional view of a tubing according to the present invention with the layer thicknesses exaggerated for purposes of illustration.

Referring now to FIG. 4, the multi-layer tube of the present invention is designated generally as 10. Multi-layer tube 10 comprises a tube or pipe 12 having an outer surface 13. Tube 12 may be formed in any conventional manner and of any suitable material. For example, tube 12 may be a welded single wall steel tube, a brazed double wall steel tube, etc. Further, aluminum, stainless steel and the like also may be used. Yet still further, tube 12 may be formed from any rigid or semi-rigid tubular material. Tube 12 may be of circular cross section as shown, however, it is to be understood that tube 12 may be formed of any suitable size and/or shape, including square, rectangular and other geometric configurations.

A zinc layer 14 is bonded to the metal tube outer surface 13. It is to be understood that any suitable zinc layer 14 may be used in accord with the present invention. However, in the preferred embodiment, the zinc layer is selected from the group consisting of zinc plating, zinc nickel alloys, zinc cobalt alloys, zinc aluminum alloys, and mixtures thereof.

A surface treatment layer 16 is bonded to the zinc layer 14. Any suitable surface treatment layer 16 may be used. However, in the preferred embodiment, surface treatment layer 16 is selected from the group consisting of a zinc/aluminum/rare earth alloy, phosphate, chromate, and mixtures thereof.

The phosphate and/or chromate may be applied in any suitable manner. In the preferred embodiment, a hot phosphoric acid is used. Without being bound to any theory, it is believed that this acid etches into the metal surface, leaving a phosphate crystalline structure in the metal, which structure aids in subsequent adhesion of polymeric materials. Over electroplating, a wet bath chromate may be used, after which the metal is rinsed well. Chromium oxides are left on the metal, which are believed to aid in corrosion resistance, and which, although optional, are further believed to enhance the advantageous properties of the phosphate. Over the zinc/aluminum/rare earth alloy treatment, a dry chromate may be used which does not require subsequent rinsing.

The zinc/aluminum/rare earth alloy used is preferably GALFAN, commercially available from Eastern Alloys, Inc. in Maybrook, N.Y.; licensed from the International Lead Zinc Research Organization, Inc. located in New York, N.Y.; and described in U.S. Pat. No. 4,448,748, discussed more fully above. Particularly preferred is the combination of the GALFAN with the phosphate, or the GALFAN with the phosphate and chromate. Without being bound to any theory, it is believed that either of these two combinations for the surface treatment layer 16 are particularly advantageous and useful in the present invention.

It is to be understood that the zinc layer 14 and/or surface treatment layer 16 may be optional components of the present invention. Various polymeric compositions may be applied directly to a bare metal surface, especially for decorative purposes. Further, it is contemplated that various polymeric compounds and/or blends, including those containing suitable ionomers, may substantially bond to an untreated metal surface, thereby giving the numerous corrosion and abrasion resistant properties enumerated herein.

A first polymeric layer 18 is bonded to the surface treatment layer 16. It is to be understood that any suitable polymeric layer may be used which suitably bonds to the surface treatment layer 16, and in turn, suitably bonds to subsequent polymeric layers, if any. In the preferred embodiment, the first polymeric layer 18 is selected from the group consisting of a thermoplastic elastomer, an ionomer, a nylon, a fluoropolymer, and mixtures thereof.

A second polymeric layer 22 may be bonded to the first polymeric layer 18 (not shown). It is to be understood that any suitable polymeric layer may be used which suitably bonds to first layer 18, and which provides suitable mechanical and chemical corrosion resistance. In the preferred embodiment, the second polymeric layer 22 is selected from the group consisting of a nylon, a thermoplastic elastomer, a fluoropolymer, and mixtures thereof.

The multi-layer tube 10 may further comprise a third polymeric layer 20 interposed between, and bonded to the first and second polymeric layers. It is to be understood that any suitable polymeric layer may be used which suitably bonds to first layer 18 and to the second layer 22 and which may optionally provide suitable cushioning, if desired. In the preferred embodiment, the third polymeric layer 20 is selected from the group consisting of an ionomer, a nylon, ethylene vinyl alcohol, a polyolefin, and mixtures thereof.

It is to be understood that any or all of the three layers, 18, 22, 20 may include multiple sublayers (not shown). Further, it is to be understood that each of the layers and/or sublayers may be formed from a single compound listed in the relevant group, or from a combination thereof. Still further, it is to be understood that each of the layers/sublayers may be comprised of the same material. The thickness of the combined polymer layers can be as little as 0.004 inch, and can be made even thinner. Successful coatings have been applied having combined polymer layer thicknesses of 0.004 inch, 0.005 inch, 0.006 inch, 0.007 inch, 0.009 inch and 0.010 inch, with a preferred range of 0.005 inch to 0.010 inch.

Examples of suitable compounds for each of the layers will be described hereinafter.

One of the advantages of the present invention is that a chemical or mechanical bond is formed between all the layers. It is believed that good bonding prevents moisture buildup beneath the layers, which buildup greatly increases the likelihood of corrosion.

An ionomer is a thermoplastic polymer that is ionically crosslinked. Ionomer technology entails the reaction of copolymers to form bonds between the acid groups within a chain and between neighboring chains. Ionomers generally consist of an organic backbone bearing a small proportion of ionizable functional groups. The organic backbones are typically hydrocarbon or fluorocarbon polymers and the ionizable functional groups are generally carboxylic or sulfonic acid groups. These functional groups, which generally reside on no more than about 10% of the monomer units in the polymer, may be neutralized, for example with sodium or zinc ions.

The presence of these ionic groups gives the polymer greater mechanical strength and chemical resistance than it might otherwise have. The ionomer is resistant to dissolution in many solvents because of its unconventional chemical character, often being too ionic to dissolve in non-polar solvents and too organic to dissolve in polar solvents. A variety of ionomers include copolymers of: styrene with acrylic acid; ethyl acrylate with methacrylic acid; and ethylene with methacrylic acid.

The presence of ions in an otherwise organic matrix is generally not thermodynamically stable. As a result, these materials undergo slight phase separation in which the ions cluster together in aggregates. These ionic clusters are quite stable and may contain several water molecules around each metal ion. They act partly as crosslinks and partly as reinforcing filler, which may provide the greater mechanical strength that ionomers exhibit.

A further general discussion of ionomers can be found in *The Chemistry of Polymers* by John W. Nicholson, published by the Royal Society of Chemistry, Thomas Graham House, Cambridge England (1991), pp. 147–149.

It is to be understood that any suitable ionomer resin may be used in the present invention, which suitable ionomer resin has substantially similar physical properties and performs in a substantially similar manner to the ionomers disclosed herein. Without being bound to any theory, it is believed that the presence of the ionomer may greatly enhance the excellent bonding formed between the metal surfaces 13, 14, 16 and the subsequent polymer layer(s). In the preferred embodiment, SURLYN ionomer resins are used. Other suitable ionomers are commercially available under the tradename IOTEK from Exxon Chemical Co. located in Houston, Tex.

SURLYN® is an ionomer resin commercially available from E. I. DuPont de Nemours & Co., located in Wilmington, Del. The chemical name of SURLYN is ethylene methacrylic acid copolymer—partial metal salt. Its chemical formula is represented as $[(CH_2CH_2)_x(CH_2CCH_3COO^-M^+)_y]_n$. In the SURLYN Ionomer Resins, ethylene and methacrylic acid copolymers are partially reacted with metallic salts.

General physical characteristics of the SURLYN Resins include a melting point between about 80° C. and about 100° C. The resins are insoluble in water and are supplied in the form of solid white pellets. The compounds have a mild methacrylic acid odor. SURLYN ionomer resins have excellent impact toughness, flexibility, cut and abrasion resistance, low temperature performance and long term durability, especially at specific gravities of less than one. The SURLYN Ionomer Resins have room temperature tensile impact properties ranging from about 730 to about 1325 $kJ/m^2$ (345 to 630 $ft-lb/in^2$). This impact performance does not drop substantially with temperature, in that the compound can offer tensile impact as high as 1190 $kJ/m^2$ (565 $ft-lb/in^2$) at −40° C. Various grades of the SURLYN Ionomer Resins have a notched Izod rating as high as 853 J/m (16 ft-lb/in). The SURLYN Resins are also highly resistant to chemical attack and permeation by liquids. They have high melt strengths and contain no plasticisers. Ionomers adhere well to metals and to finishes of epoxy and urethane. The resins range in specific gravity from 0.94 to 0.97 $g/cm^3$.

Of the SURLYN Resin grades, a preferable grade is SURLYN 8528. Also preferred is SURLYN 8527, which has the same physical properties as 8528, but offers greater clarity. It is to be understood that any grade of SURLYN is contemplated as being of use in the present invention, however, the grade of SURLYN should not possess a melt viscosity which would be so high as to hinder the advantageous functioning of the present invention. Typical physical properties of SURLYN 8528 will be discussed hereinafter.

SURLYN 8528 has excellent abrasion and cut resistance. Its processing temperature is about 450° F. (232° C.). Its density is 58.6 $lb/ft^3$ (0.94 $g/cm^3$). Its brittle temperature is −139° F. (−95° C.). Its volume resistivity is $1.00 \times 10^{16}$ Ohm cm. Its dielectric constant is $2.40 \times 10^6$ Hz.

The SURLYN 8528 toughness properties include tensile impact at 23° C. (73° F.) of 1160 $kJ/m^2$ (550 $ft-lbf/in^2$). This is as found under ASTM Method D-1822S. Another toughness property is measured by the Notched izod test. This particular test is not as relevant for tubing—a more preferred test is a Cold Temperature Impact Test as described in Performance Requirements paragraph 9.11 in SAE Standard J844 as revised in June of 1990. However, the SURLYN 8528 Notched izod is 610 J/m (11.4 ft-lb per inch of notch) under ASTM Method D-256.

For low temperature toughness, the SURLYN 8528 tensile impact at −40° C. (−40° F.) is 935 $kJ/m^2$ (445 $ft-lbf/in^2$) under ASTM Method D-1822S.

Durability is measured by abrasion resistance under ASTM Method D-1630. The SURLYN 8528 resistance is 600 under the NBS index. For clarity measurement, the haze at 0.64 cm (0.25 in) under ASTM Method D-1003A is 6%. The specific gravity under ASTM Method D-792 is 0.94 $g/cm^3$.

The stiffness and other mechanical properties of SURLYN 8528 are given by the following. The flexural modulus at 23° C. (73° F.) under ASTM Method D-790 is 220 MPa (32 kpsi). The tensile strength, yield strength and elongation are measured on Type IV bars, compression molded, with a cross head speed of 5.0 cm/min (2 in/min). All three of these properties are measured by ASTM Method D-638. The tensile strength is 29 MPa (4.2 kpsi); the yield strength is 12.4 MPa (1.8 kpsi) and the elongation is 450%. The Ross Flex was tested on compression molded samples 3.2 mm thick, pierced 2.5 mm wide, under ASTM Method D-1052. Pierced at 23° C. (73° F.), the Ross Flex is 3000 cycles to failure; and pierced at −29° C. (−20° F.) is less than 100 cycles to failure. The MIT flex is an accelerated stress crack test on a strip 25 mil. thick, flexed through 270° at 170 cycles per minute with one kilogram load in tension—#04 head. This is a test developed by Dupont. The result on the SURLYN 8528 was 2100 cycles to failure. The Shore D hardness is about 60 to 62.

General physical characteristics of SURLYN 8528 include cation type: sodium. The melt flow index, with the material dried 16 hours in a vacuum oven at 63° C. (145° F.) under ASTM Method D-1238 was 1.3 g/10 minutes. The area yield at 0.25 mm (0.10 in) was 4.2 m²/kg (20.1 ft²/lb).

Thermal characteristics include a heat deflection temperature at 455 kPa (66 psi) of about 44° C. to 51° C. (111° F. to 125° F.) under ASTM Method D-648. The Vicat temperature under ASTM Method D-1525-70 Rate B is 71° C. to 73° C. (159°–163° F.). The melting point and freezing point is determined by differential thermal analysis. The melting point is 94° C. to 96° C. (201° F. to 204° F.); and the freezing point is 75° C. (167° F.). The coefficient of thermal expansion from −20° C. to 32° C. under ASTM Method D-696 is $14 \times 10^{-5}$ cm/cm/°C. The flammability under ASTM Method D-635 is 22.9 mm/min (0.9 in/min); and the flammability passed the Motor Vehicle Safety Standard 302. The thermal conductivity is $6.0 \times 10^{-4}$ cal/cm²/sec/°C./cm. The specific heat at various degrees will be given. At −20° C. (68° F.), mean: the specific heat is 0.43 cal/gm/°C.; at 60° C. (140° F.), mean: the specific heat is 0.58 cal/gm/°C.; at melting point, mean: the specific heat is 0.86 cal/gm/°C.; and at 150° C. (302° F.), mean: the specific heat is 0.55 cal/gm/°C.

The thermoplastic elastomers which can successfully be employed in the tubing 10 of the present invention are commercially available under tradenames such as: SANTOPRENE®, a thermoplastic rubber commercially available from Advanced Elastomer Systems of St. Louis, Mo.; KRATON®, a thermoplastic rubber composed of a styrene-ethylene/butylene-styrene block copolymer commercially available from Shell Chemical Co. of Houston, Tex.; SARLINK, an oil resistant thermoplastic commercially available from Novacor Chemicals of Leominster, Mass.; and VICHEM, a family of polyvinyl chloride compounds commercially available from Vichem Corporation of Allendale, Mich.

Of the various thermoplastic elastomers suitable in the present invention, HYTREL is a preferred compound. HYTREL is a thermoplastic elastomer commercially available from E. I. DuPont de Nemours & Co., located in Wilmington, Del. It is contemplated that any grade of HYTREL is useful in the present invention, preferably such a grade which possesses a Shore D Hardness ranging between about 40 and about 55, and still more preferably, one having a Shore D Hardness of about 40. Grades having D40 (Shore) hardness include G-4074; G-4078; 4056; and 4059 FG.

The HYTREL grades listed above are polyester thermoplastic elastomers, and special features include excellent heat aging and oil (at high temperatures) resistance; can be used in light colored products; excellent low temperature properties, fatigue, flex and creep resistance.

Principal properties of the HYTREL grades listed above are as follows. Melt flow (condition): between about 5.2 (E) and about 5.4 (E); about 8.5 (L). Melting point: between about 298° F. and about 383° F. Density: between about 1.11 g/cm³ and about 1.18 g/cm³. Tensile strength, yield: between about 450 lb/in² and about 550 lb/in² (with 10% strain). Tensile strength, break: between about $2.00 \times 10^3$ lb/in² and about $4.05 \times 10^3$ lb/in². Elongation, break: between about 170% and about 600%. Flexural modulus: between about $8.00 \times 10^3$ lb/in² and about $9.80 \times 10^3$ lb/in². Izod, Notched, R. T.: about 999 ft-lb/in (no break). Vicat Soft Point: between about 226° F. and about 273° F. Water Absorption, 24 hour: between about 0.60% and about 2.50%.

A suitable nylon material includes 12 carbon block polyamides, 11 carbon block polyamides, and zinc chloride resistant 6 carbon block polyamides. Of these, Nylon 12 and zinc chloride resistant Nylon 6 are preferred. The 6-carbon block polyamide or Nylon 6 either inherently exhibits zinc chloride resistance or contains sufficient quantities of modifying agents to impart a level of zinc chloride resistance greater than or equal to that required by Performance Requirement 9.6 as outlined in SAE Standard J844 (Revised June 1990), i.e. non-reactivity after 200 hour immersion in a 50% by weight zinc chloride solution. The Nylon 6 can also be modified with various plasticizers, flame retardants and the like in manners which would be known to one reasonably skilled in the art.

Suitable fluoropolymers may include polyvinylidine fluoride, polyvinyl fluoride, ethylene tetrafluoroethylene, and mixtures thereof. The material can also be a graft copolymer of the preceding materials together with a fluorine-containing polymer such as copolymers of vinylidine fluoride and chlorotrifluoroethane. Suitable material employed may contain between about 60% and about 80% by weight polyvinylidine difluoride. Materials so formed have a melting point between about 200° C. and about 220° C. and a molding temperature between about 210° C. and about 230° C. Further suitable fluoropolymers include: a copolymer of a vinyl fluoride and chlorotrifluoroethylene, the vinyl fluoride material selected from the group consisting of polyvinylidine fluoride, polyvinyl fluoride, and mixtures thereof; a copolymer of vinyl fluoride material and ethylene tetrafluoroethylene; a non-fluorinated elastomer, and mixtures thereof. The material of choice exhibits an affinity to polymers employed in the first 18 second 22 or third 20 layers, such as, for example, Nylon 12 or Nylon 6. Some suitable fluoropolymers are commercially available under the tradename "ADEFLON A" from Atochem Inc. elf Aquitaine Group of Philadelphia, Pa.

Other suitable materials, especially useful in an interposed layer 20 or in sublayers of any of the three layers 18, 22, 20 include ethylene vinyl alcohol, selected from the group consisting of copolymers of substituted or unsubstituted alkenes having less than four carbon atoms and vinyl alcohol, and mixtures thereof. Also useful are copolymers of alkenes having less than four carbon atoms and vinyl acetate. Also suitable are polyolefin compounds, including, but not limited to polyethylene, low density polyethylene, and polypropylene.

The following is a brief description of the various exemplary, commercially available compounds described hereinabove. It is to be understood that these are examples of suitable compounds for illustrative purposes. Thus, it is to be further understood that other suitable compounds are contemplated and are within the scope of the present invention.

SANTOPRENE®, commercially available from Advanced Elastomer Systems, L. P. of St. Louis, Mo. is a thermoplastic rubber FR grade. Aside from the thermoplastic rubber, it also contains antimony trioxide flame retardant, and may contain carbon black, CAS No. 1333-86-4. SANTOPRENE® thermoplastic rubber may react with strong oxidizing chemicals, and also reacts with acetal resins at temperatures of 425° F. and above, producing decomposition of the acetal resins, and formaldehyde as a decomposition product. Decomposition of halogenated polymers and phenolic resins may also be accelerated when they are in contact with SANTOPRENE® thermoplastic rubber at processing temperatures. Physical characteristics of SANTOPRENE® include a slightly rubber-like odor, and the appearance of black or natural (colorable) pellets. It is thermally stable to 500° F. The flash ignition temperature is greater than 650° F. by method ASTM-D 1929-77, and by the same method, self-ignition temperature is above 700° F. The typical specific gravity is 0.90 to 1.28. The material has various hardnesses which are suitable in the present invention, however, in the preferred embodiment, the SANTOPRENE® thermoplastic rubber having an 80 Shore A hardness is utilized. The SANTOPRENE® thermoplastic rubber is designed to offer fluid and oil resistance equivalent to that of conventional thermoset rubbers such as neoprene. The resistance of the SANTOPRENE® rubber grades to oils can be classified by using the SAE J200/ASTM D2000 standard classification system for rubber.

ADEFLON A is a polyvinylidene fluoride commercially available from Atochem Inc. elf Aquitaine Group of Philadelphia, Pa. Its typical use is as a binding material for polyamides/polyvinylidene fluoride. The product is stable under normal use conditions, and above 230° C., there is a release of monomer traces. Physical properties include: at 20° C. the material is a granulated solid having a white/ slightly yellow color and no odor. The crystal melting point is 175° C., and beginning of decomposition is 230° C. In water at 20° C. the product is non-soluble. The density at 20° C. bulk is 1 to 1.1 g/cm$^3$.

The Vichem Corporation vinyl compounds are polyvinyl chloride compounds composed of a vinyl resin and functioning additives. The ingredients include a stabilizer, a resin CAS No. 75-01-4, a plasticizer CAS No. 68515-49-1, an epoxy soya oil CAS No. 8013-07-8, a filler CAS No. 1317-65-3 and carbon black CAS No. 1333-85-4. The specific gravity is 1.35 and the compound has the appearance of pellets and has a characteristically bland odor.

KRATON®, commercially available from Shell Chemical Co. of Houston, Tex., is a thermoplastic rubber having a specific gravity of 0.90 to 1.90 and a hardness of 15A to 60D. The tensile strength is up to 2,500 psi. The elongation is up to 750% and the tear strength is up to 750 pli (130 kN/m). The flex modulus is 750 to 100,000 psi. The service temperature is −70° C. to 150° C. The ozone resistance is excellent, UV resistance is excellent, fluid resistance is fair to excellent, and flame resistance is fair to excellent.

SARLINK is a thermoplastic elastomer commercially available from Novacor Chemicals Inc. of Leominster, Mass. The specific gravity ranges from 1.13 to 1.22. The modulus at 100% ranges between 260 and 570 psi. The tensile strength ranges between 780 and 2,060 psi. The ultimate elongation ranges between about 345 and about 395%. The tear strength ranges between about 81 and about 196 pli. The tension set ranges between about 4 and 6%. It has excellent fluid resistance to acids and alkalis, aqueous solutions, organic solvents, petroleum oils and fuels, automotive fluids such as automatic transmission, power steering, etc. and industrial fluids. It has fair fluid resistance to automotive fluids such as hydraulic brake, lithium grease, antifreeze, etc. and poor resistance to organic solvents. The SARLINK product is a solid, black pellet material with a mildly pungent odor. It is insoluble in water at 20° C.

Another suitable fluoropolymer is KYNAR, commercially available from Atochem Inc. elf Aquitaine Group of Philadelphia, Pa. KYNAR is a vinylidene fluoride-hexafluoropropylene copolymer. Its chemical name is 1-propene,1,1,2,3,3,3-hexafluoro-1,1-difluoroethene polymer. Its melting point is 155°–160° C. Its specific gravity is 1.77–1.79 at 23° C. It appears translucent and has no odor.

Another suitable fluoropolymer is CEFRAL SOFT XUA-2U, commercially available from Central Glass Company, Ltd., Chiyodaku, Tokyo, Japan is a copolymer containing 40% vinylidene fluoridechlorotrifluoroethylene copolymer, 30% polyvinylidene fluoride and 30% Nylon 12. The material has a specific gravity of 1.45 at 23° C., a melting point of 173° C. and a mold temperature of 220° F. The material has an elongation at break of 478% and a tensile strength of 430 Kgf/cm$^2$.

Yet another suitable fluoropolymer is TEFZEL, which is commercially available from DuPont Polymers, Specialty Polymer Division, Wilmington, Del. The material designates a family of ethylene tetrafluoroethylene fluoropolymers having various commercial grades. The material has a melting point between 255° C. and 280° C. as determined by ASTM method DTA D3418. The specific gravity for the material is between 1.70 and 1.72 as determined by ASTM method D792. Impact strength for the material at −65° F. is between 2.0 ft-lbs/inch and 3.5 ft-lbs/inch as determined by ASTM method D256, commonly referred to as Notched Izod Impact Strength. The hardness durometer as determined by ASTM method D2240 for all grades of TEFZEL is D70. Tensile strength at 73° F. is between 5,500 psi and 7,000 psi. TEFZEL was first introduced in 1970 having outstanding mechanical strength, high temperature and corrosion resistance. The material is available in three production grades, TEFZEL 200, TEFZEL 210 and TEFZEL 280 which can be applied in the present invention. Ultimate elongation at break is between 150% and 300%, depending on the grade as determined by ASTM method D638.

The multi-layer tube 10 may have the first polymeric layer 18 consisting essentially of an ionomer and a nylon, such as ethylene methacrylic acid copolymer—partial metal salt, and Nylon 12. This may be in any suitable percent composition and may have any additional suitable additives. In the preferred embodiment, this percent composition ratio is between about 10% and about 70% ethylene methacrylic acid copolymer—partial metal salt, and between about 90% and about 30% Nylon 12. More preferably, this percent composition ratio is between about 40% and about 60% ethylene methacrylic acid copolymer—partial metal salt, and between about 60% and about 40% Nylon 12.

The second polymeric layer 22 may consist essentially of a nylon. In the preferred embodiment, this layer is Nylon 12.

Third layer 20 may be any of the suitable materials listed hereinabove. In an alternate preferred embodiment, this third layer 20 may be a "regrind" or "recycle" of the suitable polymeric materials enumerated above. It is to be understood that the definition of "regrind" or "recycled" material as used herein comprises any generation of "regrind" or "recycled" material which substantially possesses between about 65% and about 95% (or higher) of each of the cold temperature impact, viscosity and elongation properties of the virgin material; more preferably, possesses between about 80% and 95%, and still more preferably possesses between about 90% and 95%. However, it is to be understood that any suitable regrind which performs in the desired manner in the present invention is contemplated and may successfully be used herein. If such a "regrind" is used as third layer 20, it is preferred that a virgin material be used as second (outer) layer 22.

Among some advantages of regrind material is that it is believed that the regrind is a lower viscosity material, which may enhance extrusion capabilities. Further, regrind is more rigid than virgin material, thereby improving penetration resistance as well as resistance to other damaging wear characteristics.

To further illustrate the composition, the following examples are given. It is to be understood that these examples are provided for illustrative purposes and are not to be construed as limiting the scope of the present invention.

EXAMPLE I

A ³⁄₁₆ inch brazed steel tube had a GALFAN coating of 78 g/m² and a phosphate coating of 120–250 mg/ft². Applied thereto was a coating of 0.005 inch to 0.010 inch Nylon 12. In a subsequent test, two layers of Nylon 12 having a total thickness between about 0.005 inch to 0.010 inch were also applied. In another subsequent test, three layers of Nylon 12 having a total thickness between about 0.005 inch to 0.010 inch were also applied. In all three tests, the Nylon 12 formed a tough, abrasion and corrosion resistant coating which strongly adhered to the steel tube outer surface.

EXAMPLE II

A ³⁄₁₆ inch brazed steel tube had a GALFAN and phosphate coating as noted in Example I, with an additional chromate wash, with the chromate wash having essentially no remaining weight. A first polymeric layer was applied to the surface treated tube, the layer consisting essentially of 20% SURLYN 8528 and 80% Nylon 12. Two subsequent layers of Nylon 12 were then applied. The total thickness of the three polymeric layers ranged between about 0.005 inch to 0.010 inch. The three layers formed a tough, abrasion and corrosion resistant coating which appeared to more strongly adhere to the steel tube outer surface than did the application of Nylon 12 as outlined in Example I.

EXAMPLE III

A ³⁄₁₆ inch brazed steel tube has a GALFAN coating of between about 36–95 g/m² and a phosphate coating of 120–250 mg/ft². A first layer of SURLYN 8528 is applied thereto. In a subsequent layer, 20% SURLYN 8528 and 80% Nylon 12 is applied. As an outer layer, Nylon 12 is applied. The three layers form a tough, abrasion and corrosion resistant coating which strongly adheres to the steel tube outer surface.

EXAMPLE IV

A ³⁄₁₆ inch brazed steel tube has a GALFAN coating of between about 36–95 g/m² and a phosphate coating of 120–250 mg/ft². A first layer of 20% SURLYN 8528 and 80% Nylon 12 is applied. A second layer of Nylon 6 (zinc chloride resistant) is applied. A third layer of ethylene vinyl alcohol is applied. A fourth layer of Nylon 6 (zinc chloride resistant) is applied. A fifth layer of a blend of Nylon 6 (zinc chloride resistant) and Nylon 12 is applied. A sixth, outer layer of Nylon 12 is applied. The six layers form a tough, abrasion and corrosion resistant coating which strongly adheres to the steel tube outer surface.

EXAMPLE V

Each of the tests contained in the above Examples are also performed on ⁵⁄₁₆ inch welded steel tubes and ³⁄₈ inch welded steel tubes, and give the same results noted above.

EXAMPLE VI

A ⁵⁄₁₆ inch welded steel tube had no surface treatment. Applied thereto was a coating of 0.005 inch to 0.010 inch Nylon 12. In a subsequent test, two layers of Nylon 12 having a total thickness between about 0.005 inch to 0.010 inch were also applied. In another subsequent test, three layers of Nylon 12 having a total thickness between about 0.005 inch to 0.010 inch were also applied. In all three tests, the Nylon 12 formed a decorative coating surrounding the steel tube outer surface.

While the invention has been described in connection with what is presently considered to be the most practical and preferred embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A multi-layer tube, comprising:

a metal tube having an outer surface;

a zinc layer bonded to the metal tube outer surface, wherein the zinc layer is selected from the group consisting of zinc plating, zinc nickel alloys, zinc cobalt alloys, zinc aluminum alloys, and mixtures thereof;

a surface treatment layer bonded to the zinc layer, wherein the surface treatment layer is selected from the group consisting of a zinc/aluminum/rare earth alloy, phosphate, chromate, and mixtures thereof;

a first polymeric layer bonded directly to the surface treatment layer, wherein the first polymeric layer is a thermoplastic material selected from the group consisting of thermoplastic elastomers, ionomers, nylons, fluoropolymers and mixtures thereof; and a second polymeric layer bonded to the first polymeric layer, wherein the second polymeric layer is selected from the group consisting of, nylons, thermoplastic elastomers, fluoropolymers and mixtures thereof.

2. The multi-layer tube as defined in claim 1, wherein the zinc layer has a thickness ranging between about 10 to 25 microns.

3. The multi-layer tube as defined in claim 1, wherein the surface treatment layer has a weight ranging between about 37.3 g/m² and about 97.7 g/m².

4. The multi-layer tube as defined in claim 1 wherein the first and second polymeric layers, combined, have a thickness ranging between about 75 to 300 microns.

5. The multi-layer tube as defined in claim 4 wherein the first layer thickness ranges between about 125 to 250 microns.

6. The multi-layer tube as defined in claim 1 wherein the zinc/aluminum/rare earth alloy of the surface treatment layer consists essentially of:

between about 85% and about 97% Zn;

between about 4% and about 15% Al; and at least about 5 ppm of a rare earth-containing alloy.

7. The multi-layer tube as defined in claim 1 wherein the surface treatment layer is selected from the group consisting of phosphate, chromate, and mixtures thereof.

8. A multi-layer tube, comprising:

a metal tube having an outer surface;

a zinc layer bonded to the metal tube outer surface, wherein the zinc layer is selected from the group consisting of zinc plating, zinc nickel alloys, zinc cobalt alloys, zinc aluminum alloys, and mixtures thereof;

a surface treatment layer bonded to the zinc layer, wherein the surface treatment layer is selected from the group consisting of a zinc/aluminum/rare earth alloy, phosphate, chromate, and mixtures thereof;

a first polymeric layer bonded to the surface treatment layer, wherein the first polymeric layer is selected from the group consisting of thermoplastic, elastomers, ionomers, nylons, fluoropolymers and mixtures thereof; and a second polymeric layer bonded to the first polymeric layer, wherein the second polymeric layer is selected from the group consisting of, nylons, thermoplastic elastomers, fluoropolymers and mixtures thereof; and a third polymeric layer interposed between, and bonded to the first and second polymeric layers, wherein the third polymeric layer is selected from the group consisting of, ionomers, nylons, ethylene vinyl alcohol, polyolefins, and mixtures thereof.

9. The multi-layer tube as defined in claim 8 wherein the first, second and third polymeric layers, combined, have a thickness ranging between about 75 to 300 microns.

10. The multi-layer tube as defined in claim 9 wherein the first, second and third layer thickness ranges between about 125 to 250 microns.

11. The multi-layer tube as defined in claim 8 wherein the zinc layer has a thickness ranging between about 10 to 25 microns, and the surface treatment layer has a weight ranging between about 37.3 $g/m^2$ and about 97.7 $g/m^2$.

12. The multi-layer tube as defined in claim 11 wherein the surface treatment layer is a zinc/aluminum/rare earth alloy consisting essentially of:

between about 85% and about 97% zinc;

between about 4% and about 15% aluminum; and at least about 5 ppm of a rare earth-containing alloy.

13. The multi-layer tube as defined in claim 8 wherein the first polymeric layer consists essentially of an ionomer and a nylon.

14. A multi-layer tube, comprising:

a metal tube having an outer surface;

a zinc layer bonded to the metal tube outer surface, wherein the zinc layer is selected from the group consisting of zinc plating, zinc nickel alloys, zinc cobalt alloys, zinc aluminum alloys, and mixtures thereof;

a surface treatment layer bonded to the zinc layer, wherein the surface treatment layer is selected from the group consisting of a zinc/aluminum/rare earth alloy, phosphate, chromate, and mixtures thereof;

a first polymeric layer bonded to the surface treatment layer, wherein the first polymeric layer consists essentially of an ionomer and a nylon; and a second polymeric layer bonded to the first polymeric layer, wherein the second polymeric layer is selected from the group consisting of, nylons, thermoplastic elastomers, fluoropolymers and mixtures thereof.

15. The multi-layer tube as defined in claim 14 wherein the ionomer is ethylene methacrylic acid copolymer—partial metal salt, and wherein the nylon is Nylon 12.

16. The multi-layer tube as defined in claim 15 wherein the ethylene methacrylic acid copolymer—partial metal salt comprises between about 10% and about 70% of the first polymeric layer, and wherein the Nylon 12 comprises between about 90% and about 30% of the first polymeric layer.

17. The multi-layer tube as defined in claim 15 wherein the second polymeric layer consists essentially of nylon.

18. The multi-layer tube as defined in claim 17 wherein the second polymeric layer consists essentially of Nylon 12.

19. The multi-layer tube as defined in claim 14 wherein the zinc layer has a thickness ranging between about 10 and 25 microns and the surface treatment layer has a weight between about 37.3 $g/m^2$ and about 97.7 $g/m^2$.

20. The multi-layer tube as defined in claim 19 wherein the surface treatment layer consists essentially of:

between about 85% and about 97% zinc;

between about 4% and about 15% aluminum; and at least about 5 ppm of a rare earth-containing alloy.

* * * * *